April 2, 1940.　　　　R. H. REED　　　　2,195,496

SEALING DEVICE

Filed Aug. 15, 1938

INVENTOR
Robert H. Reed
BY
HIS ATTORNEY

Patented Apr. 2, 1940

2,195,496

UNITED STATES PATENT OFFICE 2,195,496

SEALING DEVICE

Robert H. Reed, Easton, Pa., assignor to Ingersoll-Rand Company, Jersey City, N. J., a corporation of New Jersey Application August 15, 1938, Serial No. 224,891

4 Claims. (Cl. 286—11)

This invention relates to sealing devices, and more particularly to a sealing device applicable to centrifugal compressors, pumps, turbines and the like, in which the shaft projects from the casing.

One object of the invention is to assure an effective seal between the pump chamber and the atmosphere, particularly during the time the pump is idle.

Another object is to avoid excessive wear on the parts constituting the sealing device.

Other objects will be in part obvious and in part pointed out hereinafter.

Figure 1:
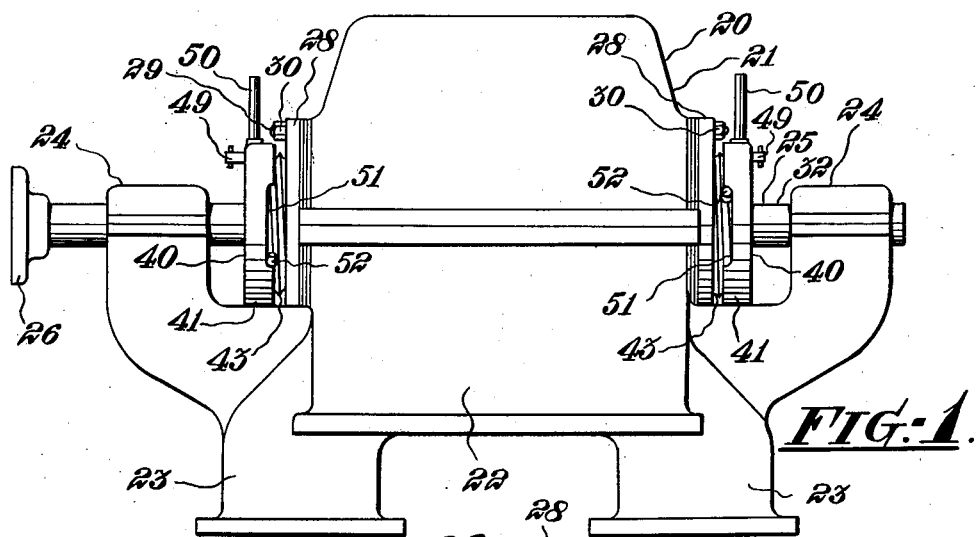
Figure 2:
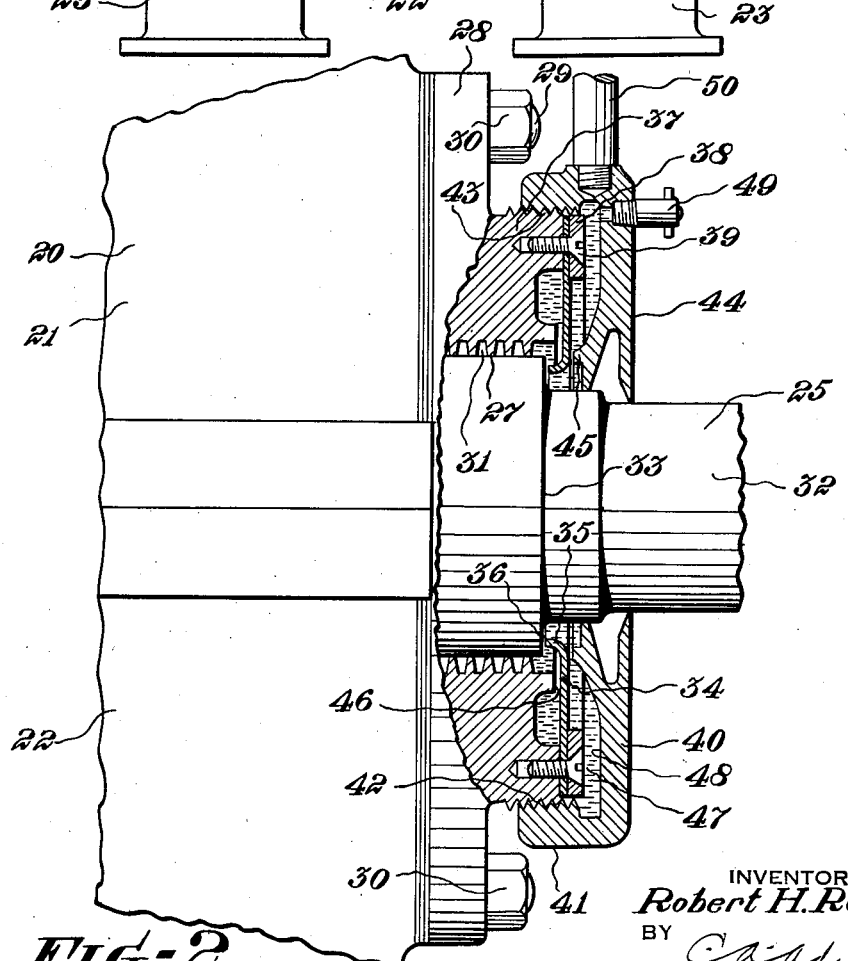

In the drawing accompanying this specification and in which similar reference numerals refer to similar parts, Figure 1 is a longitudinal, side elevation of a pump equipped with a sealing device constructed in accordance with the practice of the invention, and Figure 2 is an enlarged view, in elevation, of a portion of the pump and the sealing device, the latter being shown in section.

Referring more particularly to the drawing, the pump, designated 20 and to which the invention is applied, may be considered for the purpose of this description as being a centrifugal compressor. It comprises a casing consisting of upper and lower sections 21 and 22, respectively, and on the casing section 22 are pedestals 23 to support the compressor. The pedestals 23 also support outboard bearings 24 for the shaft 25 which projects from the ends of the casing and carries a coupling member 26 whereby the shaft may be connected to a prime mover (not shown).

The shaft 25 may carry the usual impellers (not shown) and extends through bores 27 in heads 28 forming closures for the ends of the casing. The heads 28 are secured to the casing by bolts 29 and nuts 30, and in the bores 27 are annular grooves 31 to form labyrinths for minimizing leakage of fluid medium through the heads 28.

In accordance with the practice of the invention, the portions 32 of the shaft 25 lying exteriorly of the heads 28 are of reduced diameter, and the end surface of a shoulder thus formed constitutes a sealing surface 33 for cooperation with a sealing member 34 to prevent passage to the atmosphere of any fluid that may leak through the labyrinth.

The sealing member 34 is shown as being in the form of a flexible metallic disk encircling the shaft and having a central aperture defined by an annular flange 35 which is directed toward the sealing surface 33 and has a sealing surface 36 on its end to seat against the sealing surface 33. The sealing member 34 is clamped to the end of an extension 37 on the head 28 by a ring 38 and screws 39 extending through the ring and the sealing member and threaded into the extension 37.

The sealing member 34 is so arranged and the flange 35 is of such length that when the sealing member is in a position which it naturally assumes a slight space will exist between the surfaces 33 and 36. The means provided for flexing the sealing member 34 to bring the sealing surface 36 into engagement with the sealing surface 33 preferably consists of a cap 40 movable longitudinally of the shaft 25 and having a skirt 41 with internal threads 42 cooperating with external threads 43 on the periphery of the extension 27 for this purpose.

On the inner surface of the end wall 44 of the cap is an annular rib 45 of somewhat larger diameter than the flange 35 to seat against the outer surface of the sealing member 34 for pressing the flange 35 against the surface 33. Thus, when the cap 40 is rotated in one direction the rib 45 will engage the sealing member 34 to bend it toward the sealing surface 33, and when the cap 40 is rotated in the opposite direction the rib 45 will be moved out of engagement with the sealing member which, by reason of its resiliency, will then move out of contact with the sealing surface 33.

In order to prevent the flange 35 from being pressed unduly heavily against the sealing surface 33 an annular seat or shoulder 46 is formed on the extension 37 to engage the inner surface of the resilient member. The space between the shoulder 46 and the resilient member is preferably so proportioned with respect to the space between the surfaces 33 and 36 that the distance required to bring the surface 36 into contact with the surface 33 will be sufficient to bring the resilient member 34 into contact with the shoulder 46. In this way the shoulder 46 which lies in close proximity to the flange 35 will prevent the flange from being pressed too forcibly against the surface 33.

The interior of the cap 40 between the sealing member 34 and the end wall 44 constitutes a chamber 47 for the reception of a viscid substance, as for example grease 48 which may be introduced into the chamber through a fitting 49 threaded to the end wall 44. The grease will serve both as a lubricant for the cooperating movable and stationary surfaces of the sealing device and adjacent parts and as packing material to further preclude the passage of such slight amounts of fluid as may pass over the sealing surfaces 33 and 36 and to the chamber 47. The grease 48 will, by filling the chamber 47 and the voids in direct communication with the chamber, prevent leakage of fluid through such slight spaces as may exist between the sealing member 34 and the extension 37 and past the threads 42—43 to the atmosphere.

On the periphery of each cap 40 is a handle 50 for rotating the cap on the extension 37, and in the end surface of the skirt 41 of the cap is an elongated recess 51 of which the ends cooperate with a pin 52 in the periphery of the extension 37 to limit the degree of rotary movement of the cap 40 with respect to the extension 37. The stop arrangement for the cap 40 thus provided will prevent the unscrewing of the cap 40 to a position that might provide a chamber 47 of unduly large volume and consequently make it possible to introduce too large an amount of grease into the chamber.

During the normal operation of the compressor the cap 40 occupies a position in which the rib 45 is out of engagement with the sealing member 34. The sealing surface 36 will then also be out of engagement with the sealing surface 33. In this position of the parts any small amounts of fluid that may pass through the labyrinth will be restrained from flowing to the atmosphere by the grease 48.

At the expiration of a period of operation the cap 40 is rotated to bring the shoulder 46 into engagement with the sealing member 34 and to press the sealing surface 36 against the sealing surface 33. The grease within the chamber 47 will then be compressed and, in conjunction with the sealing surfaces 33 and 36, will prevent leakage of fluid to the atmosphere.

I claim:

1. In a sealing device, the combination of a casing and a rotor therein, a sealing surface on the rotor, a flexible diaphragm on the casing, a flange integral with and formed by the diaphragm extending toward the sealing surface and having a second sealing surface on the end thereof, and a cap threadedly connected to the casing and moving independently of the diaphragm for selectively moving the second sealing surface into contact with the first said sealing surface.

2. In a sealing device, the combination of a casing and a rotor therein, a shoulder on the rotor constituting a sealing surface, a head on the casing having a bore through which the rotor extends, an annular flexible diaphragm secured on the head and encircling the rotor, an annular flange integral with and formed on the diaphragm extending toward the sealing surface and having a second sealing surface on the end thereof, a manually rotatable cap on the head movable relative to the diaphragm, an annular rib on the cap to bear against the diaphragm and press the second sealing surface into engagement with the first said sealing surface, and an annular shoulder on the head to act as a stop for the flexible diaphragm to limit movement of the second sealing surface toward the first said sealing surface.

3. In a sealing device, the combination of a casing and a rotor therein, a shoulder formed on the rotor and constituting a sealing surface, a head on the casing having a bore through which the rotor extends, an annular flexible diaphragm secured on the head and encircling the rotor, an annular flange integral with and formed on the diaphragm extending toward the sealing surface and having a second sealing surface on the end thereof normally out of contact with the first said sealing surface, a manually rotatable cap engaging the head and cooperating with the rotor and head to define a chamber, an annular rib on the cap to bear against the diaphragm and press the second sealing surface into engagement with the first said sealing surface, a shoulder on the head to act as a stop for the diaphragm to limit movement of the second sealing surface toward the first said sealing surface, and viscid packing in the chamber to provide a seal when the sealing surfaces are disengaged.

4. In a sealing device, the combination of a casing and a rotor therein, a shoulder on the rotor constituting a sealing surface, a head on the casing having a bore through which the rotor extends, an annular flexible diaphragm secured on the head and encircling the rotor, an annular flange integral with and formed on the diaphragm extending toward the sealing surface and having a second sealing surface on the end thereof normally out of contact with the first said sealing surface, a manually rotatable cap engaging the head provided with a recess and cooperating with the rotor and head to define a chamber, an annular rib on the cap to bear against the diaphragm to press the second sealing surface into engagement with the first said sealing surface, a shoulder on the head to act as a stop for the diaphragm to limit the movement of the second sealing surface toward the first said sealing surface, viscid packing in the chamber to provide a seal when the sealing surfaces are disengaged, and a pin on the head to cooperate with the recess in the cap to limit the degree of rotary movement of the cap with respect to the head.

ROBERT H. REED.